US009107350B2

(12) United States Patent
Shields et al.

(10) Patent No.: US 9,107,350 B2
(45) Date of Patent: Aug. 18, 2015

(54) MOLLUSK BARRIER

(76) Inventors: Kenneth M. Shields, Tacoma, WA (US); William K. M. Shields, Tacoma, WA (US)

(*) Notice: Subject to any disclaimer, the term of this patent is extended or adjusted under 35 U.S.C. 154(b) by 152 days.

(21) Appl. No.: 12/981,357

(22) Filed: Dec. 29, 2010

(65) Prior Publication Data
US 2011/0154732 A1    Jun. 30, 2011

Related U.S. Application Data

(60) Provisional application No. 61/290,851, filed on Dec. 29, 2009.

(51) Int. Cl.
*A01M 29/20*    (2011.01)
*A01G 13/10*    (2006.01)
*A01G 9/02*    (2006.01)
*A01M 29/30*    (2011.01)

(52) U.S. Cl.
CPC .............. *A01G 9/02* (2013.01); *A01G 13/105* (2013.01); *A01M 29/30* (2013.01)

(58) Field of Classification Search
CPC ... A01M 25/008; A01M 29/34; A01M 29/32; A01M 29/12; A01M 29/00; A01M 29/30; A01G 13/10; A01G 13/105; A01G 1/08; A01G 9/02; E01C 11/221; B63B 17/00; B63B 35/14; A01K 3/005
USPC .............. 43/1, 124, 131, 132.1, 107; 47/32.4, 47/32.5; 52/101
IPC ............ A01G 13/00; A01M 1/20, 25/00, 29/00, A01M 29/30, 29/34; A01K 3/00
See application file for complete search history.

(56) References Cited

U.S. PATENT DOCUMENTS

| | | | |
|---|---|---|---|
| 413,507 A | 10/1889 | Halstead | |
| 564,591 A * | 7/1896 | Clune et al. | ..................... 256/11 |
| 1,373,827 A | 4/1921 | Nelson | |
| 4,319,423 A | 3/1982 | Judd | |
| 4,471,562 A | 9/1984 | Brucker | |
| 4,756,116 A | 7/1988 | Cutter | |
| 4,761,923 A * | 9/1988 | Reum et al. | .................... 52/102 |
| 5,170,584 A | 12/1992 | Perry | |
| 5,337,513 A | 8/1994 | Harvey | |
| 5,379,546 A * | 1/1995 | Popp | ............................... 47/33 |

(Continued)

FOREIGN PATENT DOCUMENTS

| | | | | |
|---|---|---|---|---|
| JP | 04190732 A | * | 7/1992 | ............ A01M 29/00 |
| JP | 08090630 A | * | 4/1996 | .............. B29C 47/12 |

(Continued)

OTHER PUBLICATIONS

Machine translation of JP 11-191917 to Masaki et al., published Jul. 1999.*

(Continued)

*Primary Examiner* — Kathleen Alker
(74) *Attorney, Agent, or Firm* — Christensen O'Connor Johnson Kindness PLLC

(57) ABSTRACT

A barrier for deterring slugs, snails, and other gastropod mollusks from entering an area, and a method for using the same are provided. The barrier includes an elongate tubular support having a plastically deformable core member and an outer sheath. A plurality of outwardly extending projections are attached to the tubular support.

8 Claims, 11 Drawing Sheets

(56) References Cited

U.S. PATENT DOCUMENTS

| | | |
|---|---|---|
| 5,390,441 A | 2/1995 | Pence |
| 5,531,044 A * | 7/1996 | Wallenius .......................... 47/33 |
| 5,596,834 A * | 1/1997 | Ritter .............................. 43/124 |
| 5,768,824 A * | 6/1998 | Matz ................................. 47/33 |
| 6,016,768 A * | 1/2000 | Colucci ........................ 119/57.9 |
| 6,108,969 A * | 8/2000 | Danna et al. ....................... 47/33 |
| 6,226,933 B1 * | 5/2001 | Nelson et al. ................... 52/101 |
| 6,691,454 B1 | 2/2004 | Conroy |
| 2005/0081426 A1 | 4/2005 | Hsia |
| 2005/0189529 A1* | 9/2005 | Humphreys et al. ............ 256/12 |
| 2007/0271859 A1* | 11/2007 | Scheirs ........................... 52/101 |

FOREIGN PATENT DOCUMENTS

| | | | | |
|---|---|---|---|---|
| JP | 11191917 A | * | 7/1999 | ............... H02G 7/00 |
| JP | 2002300843 A | * | 10/2002 | ............ A01M 29/00 |
| JP | 2007151426 A | * | 6/2007 | ............ A01M 29/00 |

OTHER PUBLICATIONS

Machine translation of JP 2007151426 to Murakami et al., published Jun. 21, 2007.*

* cited by examiner

MOLLUSK BARRIER

CROSS-REFERENCE TO RELATED APPLICATION

This application claims the benefit of U.S. Provisional Patent Application No. 61/290,851, filed Dec. 29, 2009, the entire disclosure of which is incorporated herein by reference.

BACKGROUND

Slugs, snails, and other gastropod mollusks consume plant matter and are a major cause of plant and crop damage, both in home gardens and in agriculture. Traditional methods of slug and snail control include the use of salt, toxic bait, traps, and electrical barriers. However, these traditional methods have certain limitations. Salt and toxic bait remain effective for only a limited period of time before they disperse into the environment. Traps are cumbersome and must be emptied regularly. Electrical barriers are complex, costly, and require a significant amount of maintenance. Thus, there exists a need for a physical barrier for deterring or preventing slugs and snails from entering an area, such as a garden or farm, where plants are vulnerable to predation.

SUMMARY

The summary is provided to introduce a selection of concepts in a simplified form that are further described below in the detailed description. The summary is not intended to identify key features of the claimed invention, nor is it intended to be used as an aid in determining the scope of the claimed subject matter.

In one aspect, the invention relates to a barrier for deterring gastropod mollusks from entering an area. The barrier includes:

(a) an elongate tubular support comprising a plastically deformable core member and an outer sheath; and (b) a plurality of outwardly extending projections attached to the tubular support, the projections spaced circumferentially and longitudinally along the tubular support to define a barrier.

In one embodiment, the plastically deformable core member is a metal wire.

In one embodiment, the plastically deformable core member is a copper wire.

In one embodiment, the outer sheath is polypropylene.

In one embodiment, the outer sheath has at least one opening that exposes the core member.

In one embodiment, the barrier has a first end and a second end, the first and second ends being releasably connectable.

In one embodiment, the barrier has a plurality of outwardly extending spikes attached to the tubular support.

In one embodiment, the barrier has a plurality of arcuate projections (e.g., C-shaped, U-shaped, O-shaped, or the like) attached to the tubular support, the arcuate projections oriented substantially longitudinally along the tubular support and configured to define a through-hole through which a spike can be inserted.

In another aspect, the invention relates to a method for deterring gastropod mollusks from entering an area. The method includes:

(a) positioning a barrier along the perimeter of the area, wherein the barrier comprises:

(i) an elongate tubular support comprising a plastically deformable core member and an outer sheath; and (ii) a plurality of outwardly extending projections attached to the tubular support, the projections spaced circumferentially and longitudinally along the tubular support to define a barrier.

In one embodiment, the plastically deformable core member is a metal wire.

In one embodiment, the plastically deformable core member is a copper wire.

In one embodiment, the outer sheath is polypropylene.

In one embodiment, the outer sheath has at least one opening that exposes the core member.

In one embodiment, the barrier has a first end and a second end, the first and second ends being releasably connectable.

In one embodiment, the barrier has a plurality of outwardly extending spikes attached to the tubular support.

In one embodiment, the barrier has a plurality of C-shaped receivers attached to the tubular support, the receivers oriented substantially longitudinally along the tubular support and configured to define a through hole through which a spike can be inserted.

In one aspect, the invention relates to a planter having an integrated gastropod mollusk barrier. The planter includes:

(a) a plant pot; and (b) a plurality of outwardly extending pointed projections attached to the plant pot, the pointed projections spaced vertically and horizontally to define a belt around the plant pot.

In one embodiment, the pointed projections are arcuately shaped and have tips, the tips oriented in a substantially downward direction.

In one embodiment, the planter has a cover that can be temporarily positioned over the projections to facilitate handling the planter, the cover being configured to accept the projections.

In one embodiment the cover is configured to be used as a handle for lifting the plant pot.

In one embodiment, the cover is foam.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

A barrier for deterring gastropod mollusks, such as slugs and snails, is disclosed. The mollusk barrier can be used for deterring slugs and snails from entering a protected area. For example, a user can position the mollusk barrier around a single plant, a group of plants, or an entire garden or farm. Alternatively, the mollusk barrier of the present invention can be integrated into a stand-alone planter or plant pot.

The mollusk barrier may be used without traditional slug and snail repellants, such as salt and toxic bait, electrical barriers, and traps. Moreover, the mollusk barrier can be cut to a desired length and is easily bendable to conform to a desired profile. Thus, the mollusk barrier is customizable and provides the user with maximum flexibility in how the barrier is configured and where the barrier is placed.

Figure 1:
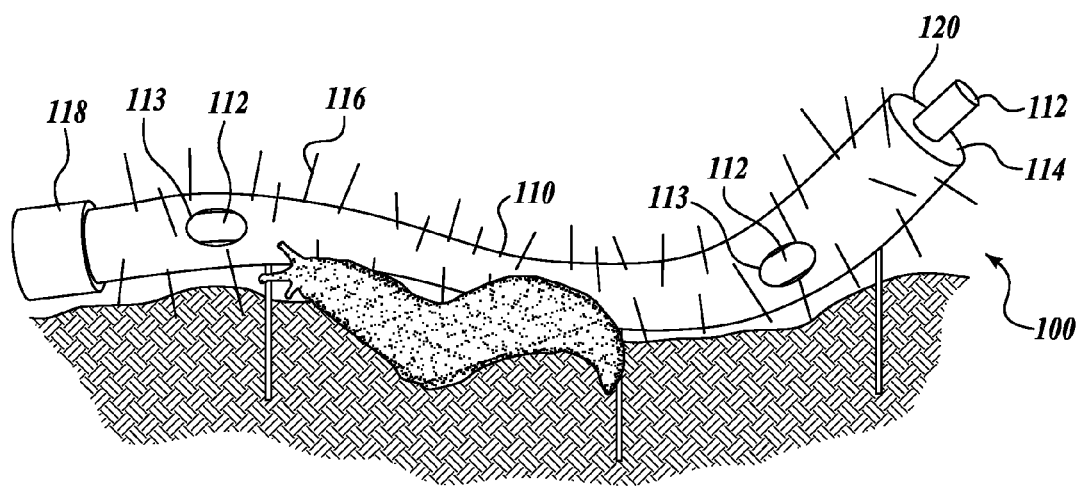
FIG. 1 is a sketch showing a perspective view of a mollusk barrier made in accordance with the teachings of the present invention.

A mollusk barrier 100 in accordance with the teachings of the present invention is shown in FIG. 1. The mollusk barrier 100 has an elongate tubular support 110 having a plastically deformable core member 112 and an outer sheath 114. A plurality of closely-spaced outwardly extending projections 116 are attached to the tubular support 110. The projections 116 are spaced circumferentially and longitudinally along the tubular support 110 to define a barrier. In one embodiment, the largest spacing between neighboring projections 116 is about 1/8 of an inch. However, it should be appreciated that the largest spacing between neighboring projections 116 could range from about 1/25 of an inch to about 1/8 of an inch. Although FIG. 1 shows the projections 116 of the barrier 100 positioned with somewhat random placement and orientations, it will be readily appreciated by persons of skill in the art that the projections 116 may alternatively be provided in a more orderly configuration, for example in one or more rows wherein all of the projections 116 are substantially parallel, e.g., in a comb-like manner.

The plastically deformable core member 112 may comprise a metal wire, for example, a copper wire. The core member 112 is sufficiently flexible that a user can plastically deform the mollusk barrier 100 into a desired shape. The core member 112 is also sufficiently rigid that it retains the desired shape. In a current embodiment the outer sheath 114 of the mollusk barrier 100 comprises polypropylene. It is also contemplated that the outer sheath 114 of the mollusk barrier 100 may incorporate a repellent, for example, copper particles or a chemical repellent. The outer sheath 114 may have one or more openings 113 that expose the core member 112. When the core member 112 is a copper wire, for example, the exposed portion of the core member 112 provides an additional deterrent to slugs and snails that are repelled by contact with copper metal. The overall diameter of the elongate tubular support 110 can vary depending on the needs of the gardener or farmer.

The mollusk barrier 100 has a first end 118 and a second end 120. The first end 118 and second end 120 of the mollusk barrier 100 are releasably connectable so that two or more mollusk barriers 100 can be joined together. The first end 118 and second end 120 can be joined together by any traditional means, for example, a hook and loop closure, ball and socket connector, snaps, screws, male and female connectors, adhesives, or the like.

Figure 2:
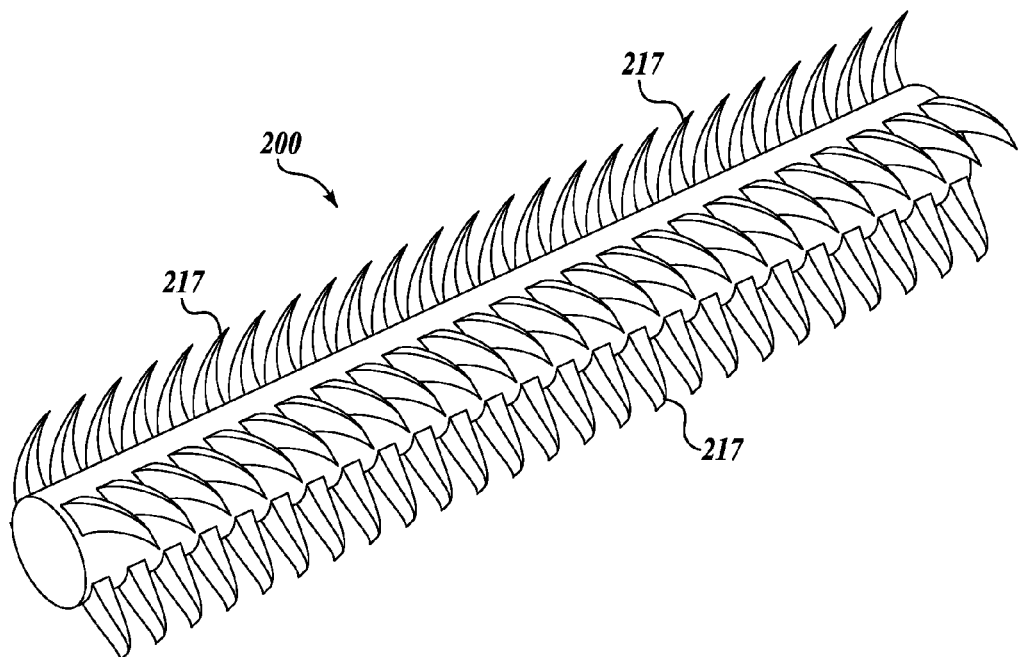
FIG. 2 shows a second embodiment of a mollusk barrier made in accordance with the teachings of the present invention.

FIG. 2 is a sketch showing a perspective view of a second embodiment of a mollusk barrier 200 that is similar to the mollusk barrier 100, but with arcuately-shaped projections 217. The arcuate shape of the projections 217 deters slugs and snails while allowing the mollusk barrier 200 to be handled by a user without causing substantial discomfort, or even injury, from the projections 217. Whereas linear projections could puncture a user's hand, arcuate projections 217, such as those shown in FIG. 2, can be handled without discomfort.

Figure 3:
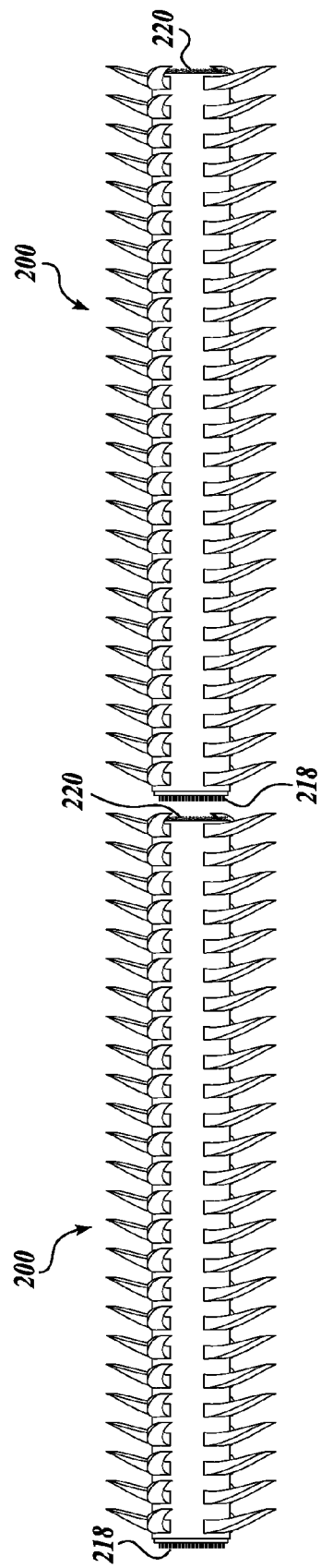
FIG. 3 is a sketch showing a side view of two mollusk barriers of FIG. 2 being joined in an end-to-end configuration.

FIG. 3 is a sketch of two mollusk barriers 200 being joined together in an end-to-end configuration. In FIG. 3, the second end 220 of mollusk barrier 200 on the left is joined to the first end 218 of mollusk barrier 200 on the right.

Figure 4:
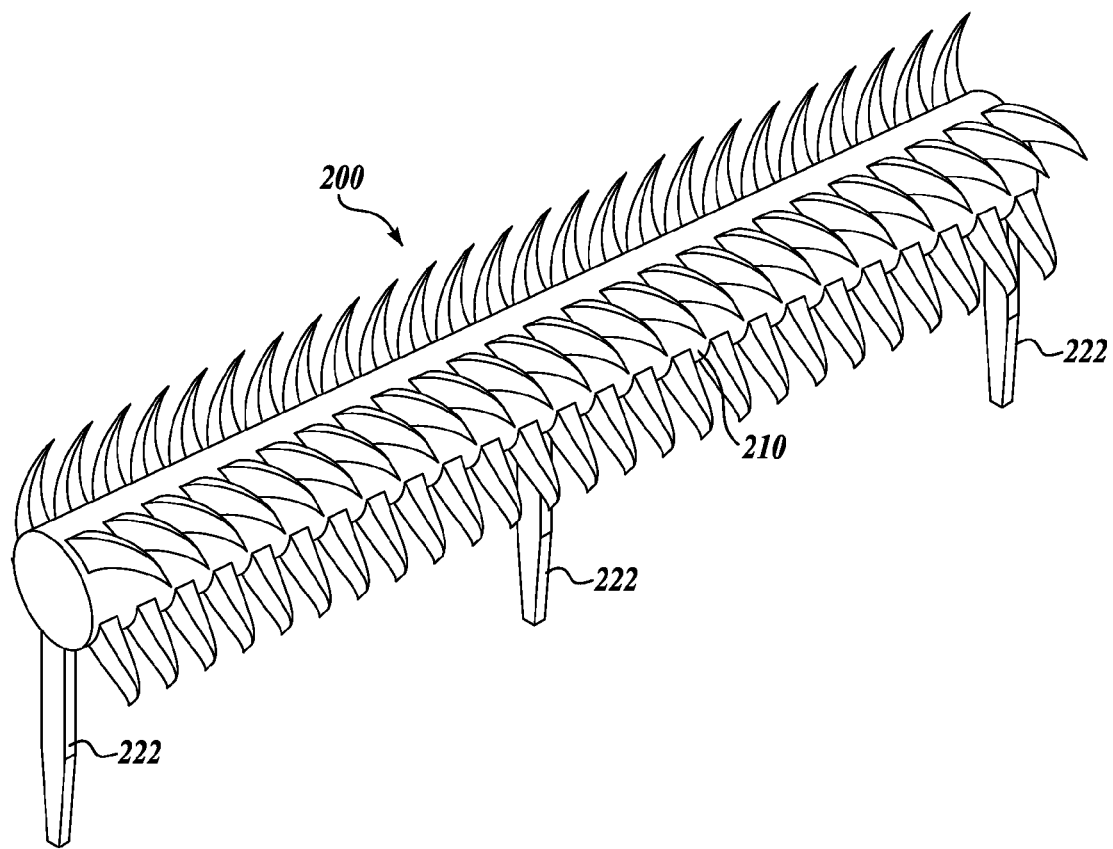
FIG. 4 shows a third embodiment of a mollusk barrier with spikes.

A mollusk barrier 200 can be secured to a substrate, such as the ground, in different ways. For example, FIG. 4 shows a mollusk barrier 200 similar to a mollusk barrier shown in FIG. 2 but having a plurality of outwardly-extending spikes 222 that are attached to the tubular support 210. The spikes 222 are spaced longitudinally along the tubular support 210, and can be inserted into the ground to retain the mollusk barrier 200 in a desired position or location.

Figure 5:
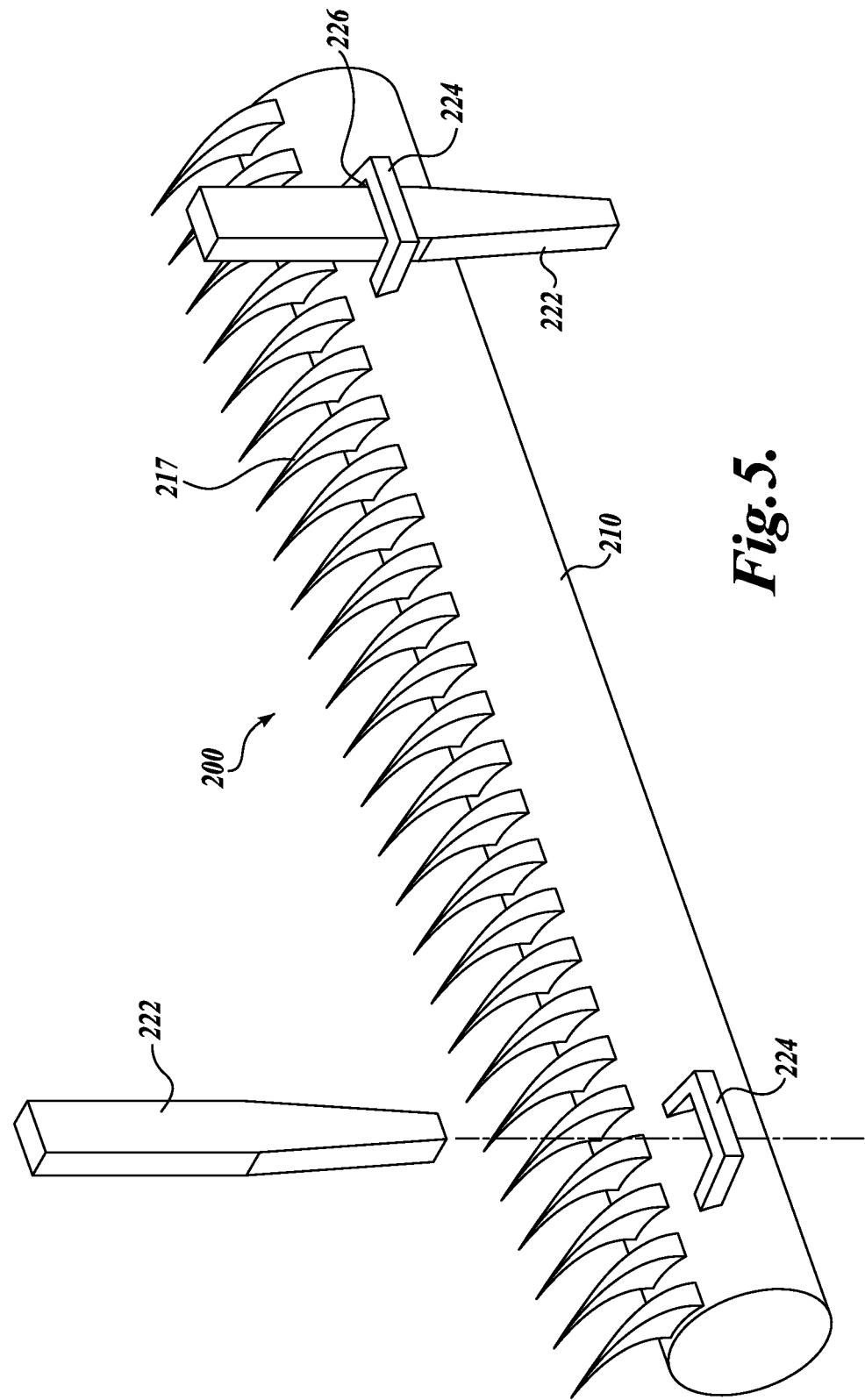
FIG. 5 is a sketch showing a perspective view of a mollusk barrier with C-shaped projections and separable spikes.

As seen most clearly in FIG. 5, a mollusk barrier 200 may include a plurality of C-shaped receivers 224 attached to the tubular support 210 and oriented substantially longitudinally along the tubular support 210, each receiver 224 defining a through-hole 226 through which the spike 222 is inserted. The spikes 222 are driven into the ground to prevent the mollusk barrier 200 from being displaced. In this embodiment the barrier 200 includes a single row of arcuate projections 217.

Figure 6:
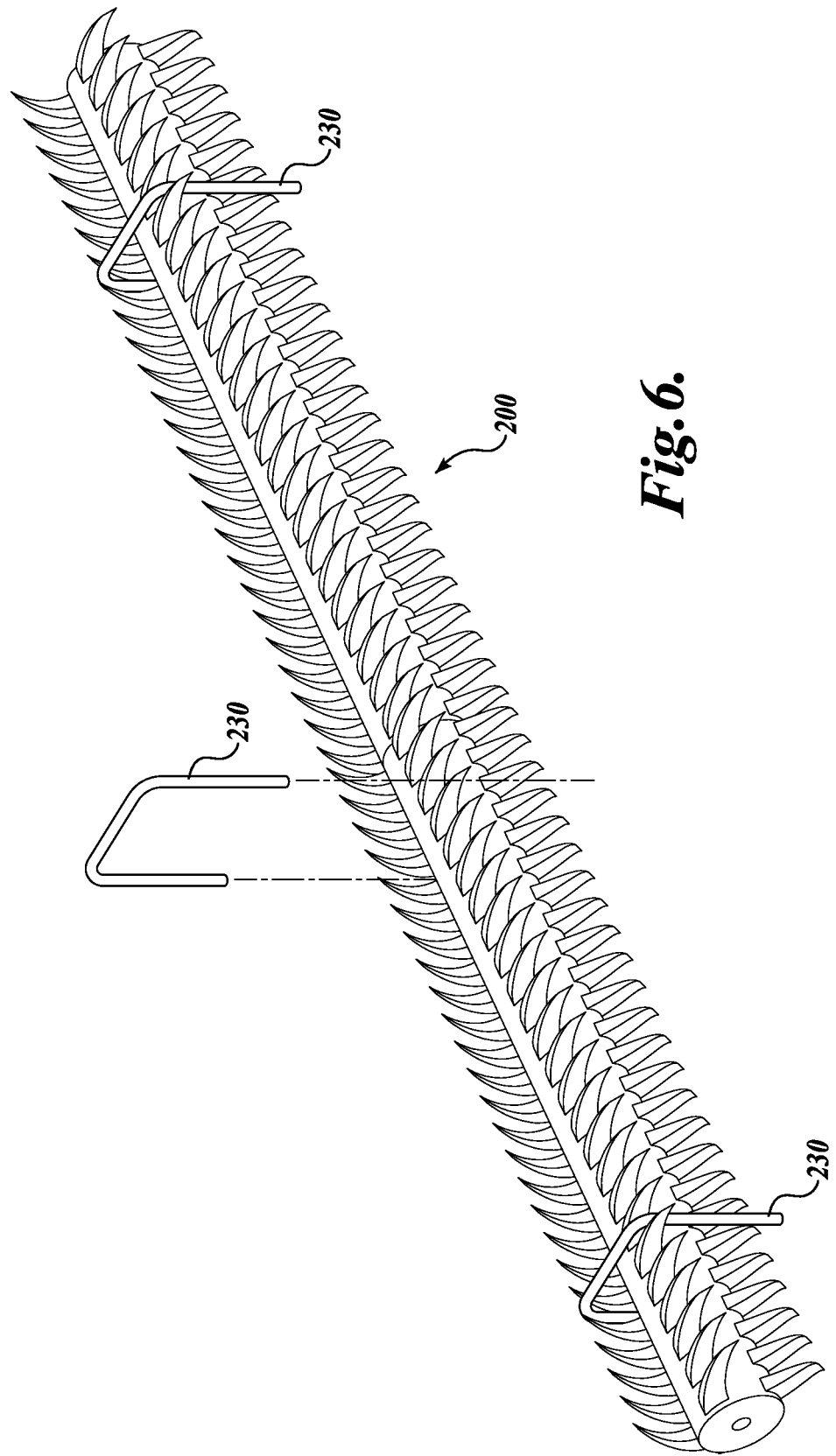
FIG. 6 is a sketch showing a perspective view of the mollusk barrier secured to the ground with C-shaped clips.

Yet another way of securing the mollusk barrier to the ground is shown in FIG. 6 wherein a mollusk barrier 200 is attached to the ground with a plurality of C-shaped retainers 230. The C-shaped retainers 230 are placed over the mollusk barrier 200 and can be inserted at desired intervals along the length of the mollusk barrier 200. Although the exemplary retainers 230 shown in FIG. 6 are illustrated as generally symmetrical with parallel legs, it will be readily apparent to persons of skill in the art that the retainers 230 may be alternatively shaped. For example, the retainers may have a shorter leg on one side, such that only one leg is pushed into the ground, while the remaining portions extend over and around the barrier 200. Moreover, the over extending portion may be curved to generally conform with the shape of the barrier 200, and/or may have an inward extension or bulge at the distal end to more securely retain the barrier 200. Similarly, the leg extending into the ground may be curved to be generally parallel to the outer boundary of the barrier 200.

The mollusk barrier 100, 200 can be any color. For example, earth tones such as brown and green are less visible in the garden and would help the mollusk barrier 100, 200 to blend in with its surroundings. On the other hand, bright colors such as red, pink, orange, and yellow are highly visible in the garden, and would help the mollusk barrier 100, 200 to be easily seen.

In one aspect, the invention relates to a method for deterring gastropod mollusks from entering a protected area. The method includes positioning a mollusk barrier 100, 200 of the present invention along the perimeter of an area. The mollusk barrier 100, 200 can be configured to fit or surround a particular area in any number of ways. For example, the mollusk barrier 100, 200 can be shortened by cutting the mollusk barrier 100 to a desired length. The mollusk barrier 100, 200 can be cut using commonly available tools such as shears, pruners, loppers, clippers, and the like. The mollusk barrier 100, 200 can lengthened by joining two or more sections of the mollusk barrier 100, 200 together in an end-to-end configuration. The mollusk barrier 100, 200 is also flexible, and can be configured to define a desired profile.

Figure 7A:
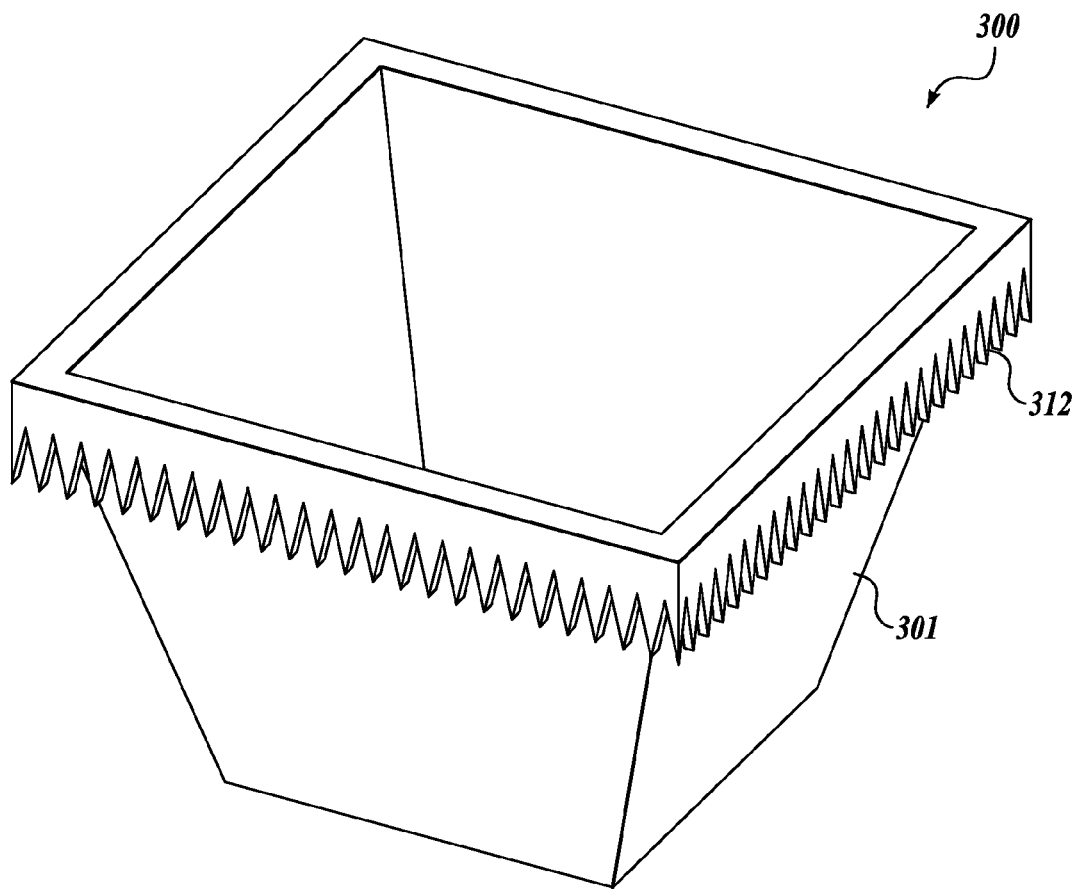
FIGS. 7A, 7B and 7C are sketches showing a planter with an integrated mollusk barrier and optional handles in accordance with the teachings of the present invention.
Figure 7B:
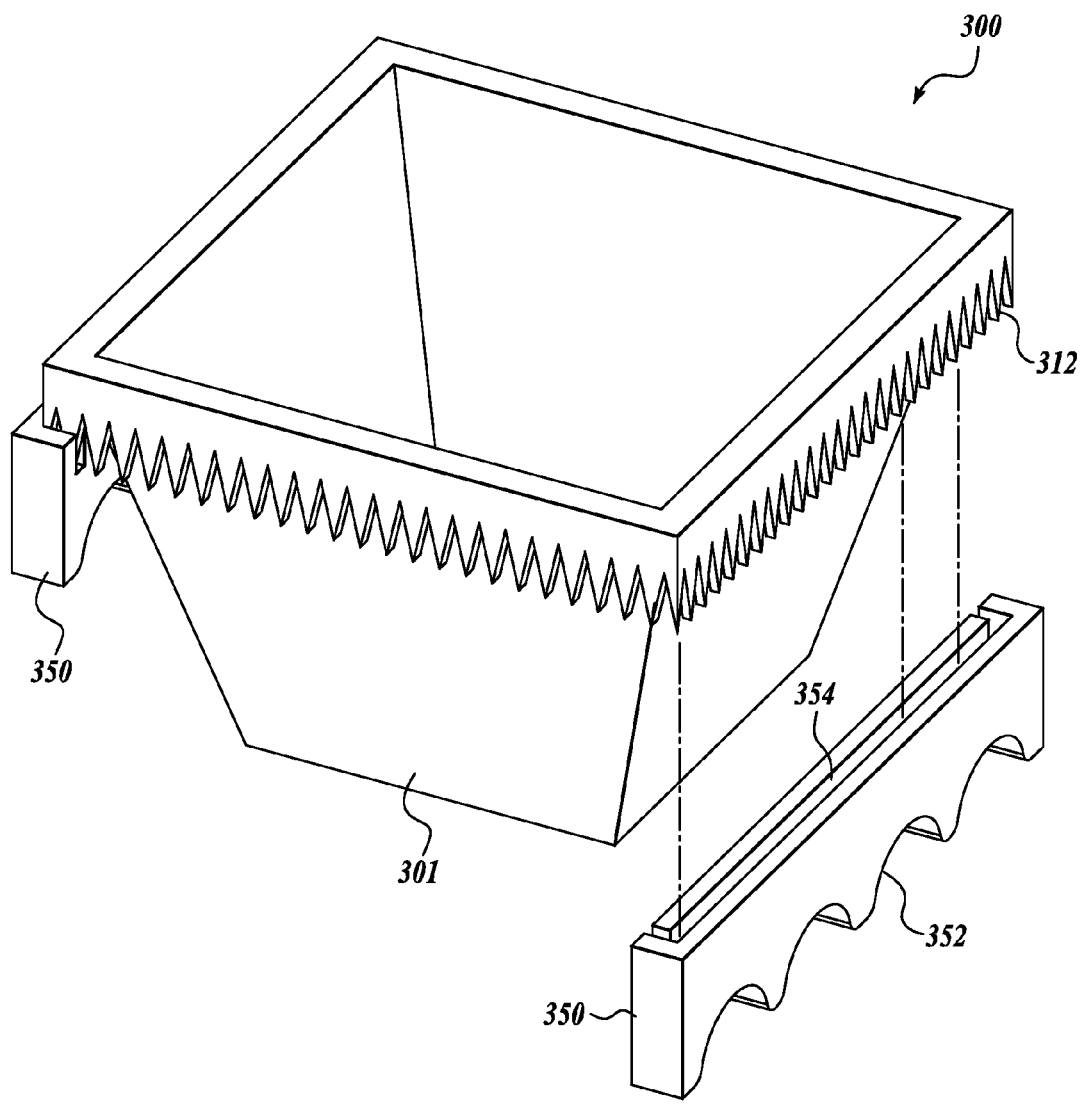
Figure 7C:
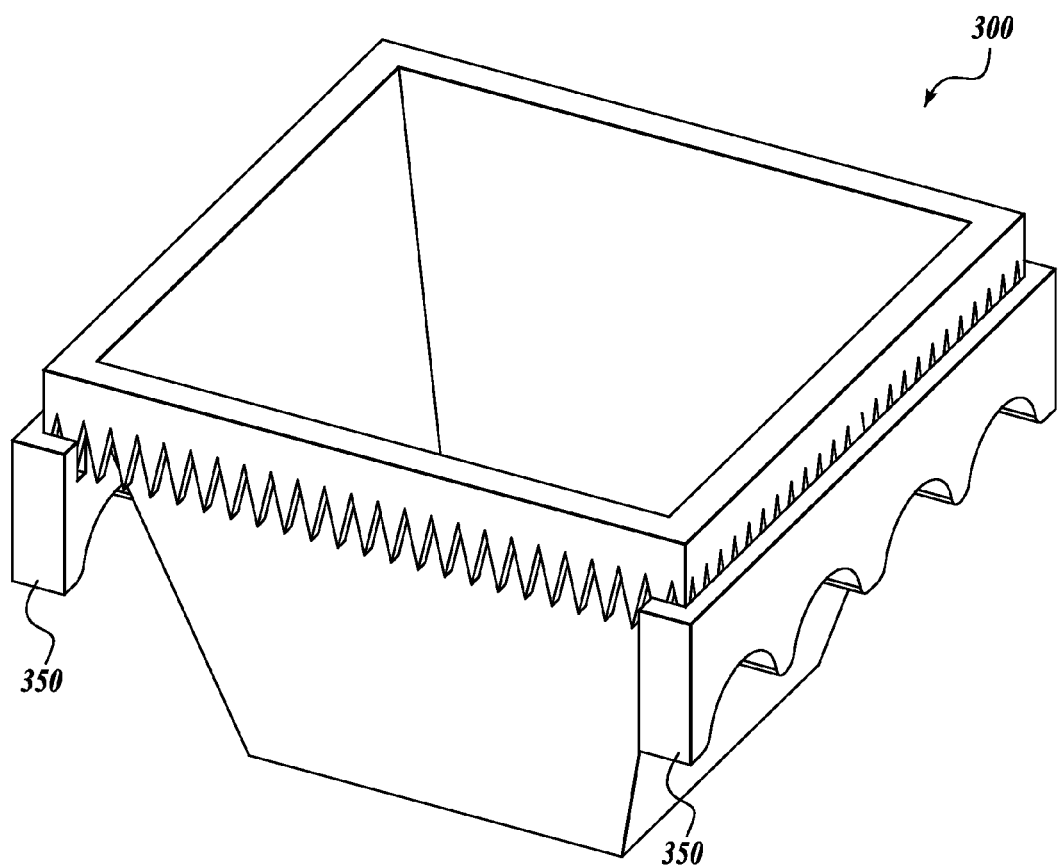
Figure 8:
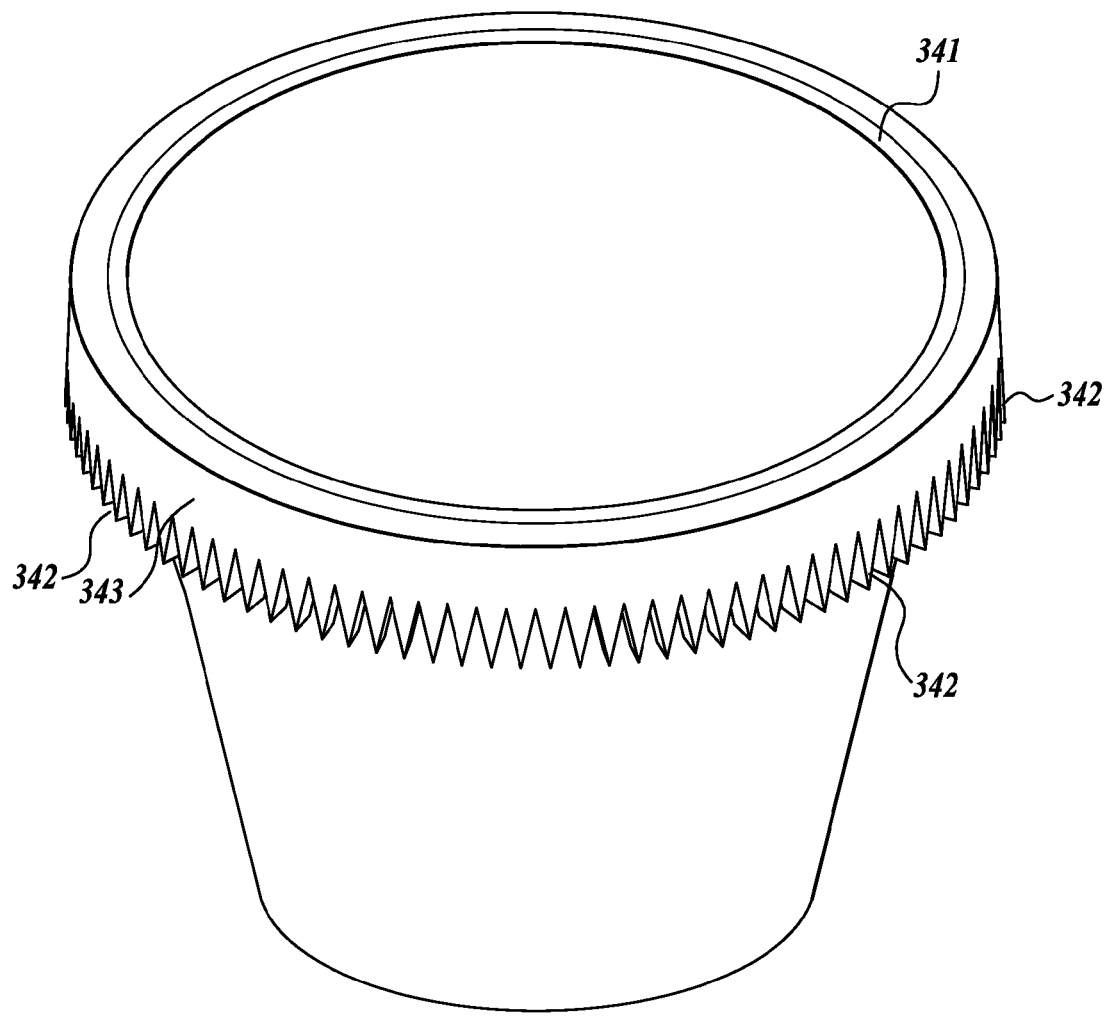
FIG. 8 is a sketch showing a planter with an integrated mollusk barrier.

In one aspect, the invention relates to a planter having an integrated mollusk barrier. FIGS. 7A, 7B, and 7C are sketches showing a planter 300 with an integrated mollusk barrier 312. Referring to FIG. 7A, the planter 300 includes a plant pot 301 and a plurality of outwardly or downwardly extending pointed projections that are affixed to the plant pot 301 and that define the barrier 312. The mollusk barrier 312 is spaced vertically and horizontally to define a belt around the plant pot 301. As shown in FIG. 7A, the mollusk barrier 312 encircles the plant pot 301. The mollusk barrier 312 can be located near the upper portion of the plant pot 301 as shown in FIG. 7A. The mollusk barrier 312 may alternatively be located the middle portion of plant pot 301 or the lower portion of the plant pot 301. Although the planter 300 is depicted as having a rectangular-shaped plant pot 301, it should be appreciated that the plant pot may be alternatively shaped, e.g., round or oblong. For example, FIG. 8 is a sketch showing a plant pot 341 with a belt 343. The belt 343 has a plurality of projections defining a mollusk barrier 342 that are spaced vertically and horizontally around the belt 343.

It will be appreciated by comparing, for example, FIG. 5 with FIGS. 7A and/or 8 that a mollusk barrier may be configured as a separable member, for example an a planter such as planter 300 (FIG. 7A). Such a flexible barrier may be reconfigured for use with a planter of arbitrary shape. In particular, the barrier may be made with a formable core, and may be cut to length or combined end to end with a other barriers, to fit a particular planter. For example, the barrier may be provided with a U-shaped inner rim to hook over the top of the planter, or with a plurality of discrete elements similar to spikes 222, or the like. Such separable barrier may be placed on the edge of the planter, or on the edge of a water catcher (not shown) disposed under the planter, to prevent mollusks from climbing into the planter. It will also be appreciated that the pointed projections that define the mollusk barrier can be arcuately shaped and have tapered tips oriented in a substantially downward direction. The downward orientation of the tips deters slugs and snails from climbing up from the base of the planter.

When the planter 300 is in use, it is generally desirable for the projections to be exposed. However, when the planter 300 is not in use, it may be desirable to transport the planter with a pair of handles or to cover the projections with a covering to prevent injury to the user. The handles and/or covering can be sold with the planter or sold separately.

A pair of handles 350 for use with the planter 300 is shown in FIGS. 7B and 7C. The handles 350 may have recesses 354 to receive the pointed projections defining the mollusk barrier 312 of the planter 300. The handles 350 is shaped with recesses 352 along a lower edge to accommodate the user's hand. The handles 350 are suitable for use with a square-shaped or rectangular-shaped plant pot 301. FIG. 7C is a sketch that shows the handles 350 installed on a planter 300. In the current embodiment the recess 352 is shaped with angled end portions to receive facilitate slidably engaging the mollusk barrier 312.

Figure 9:
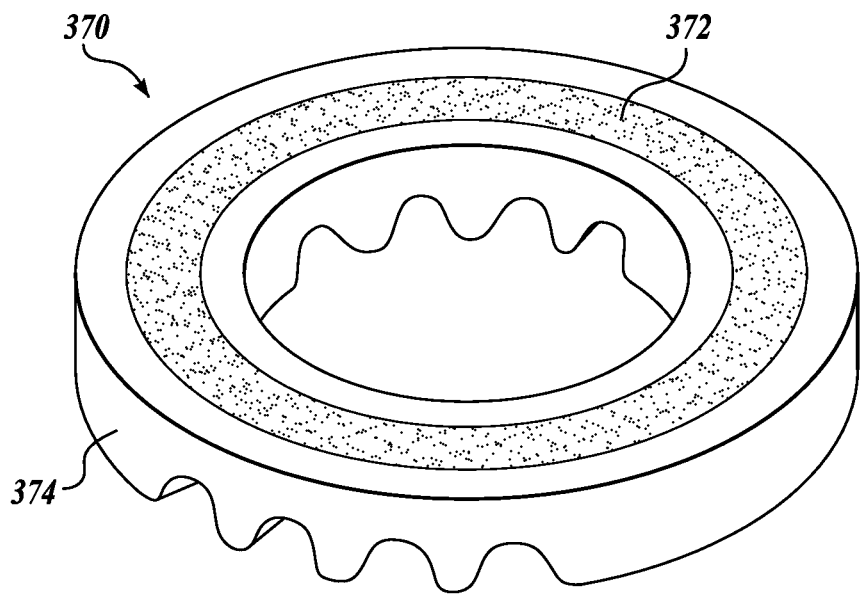
FIG. 9 is a sketch showing a removable handle for a planter.
Figure 10:
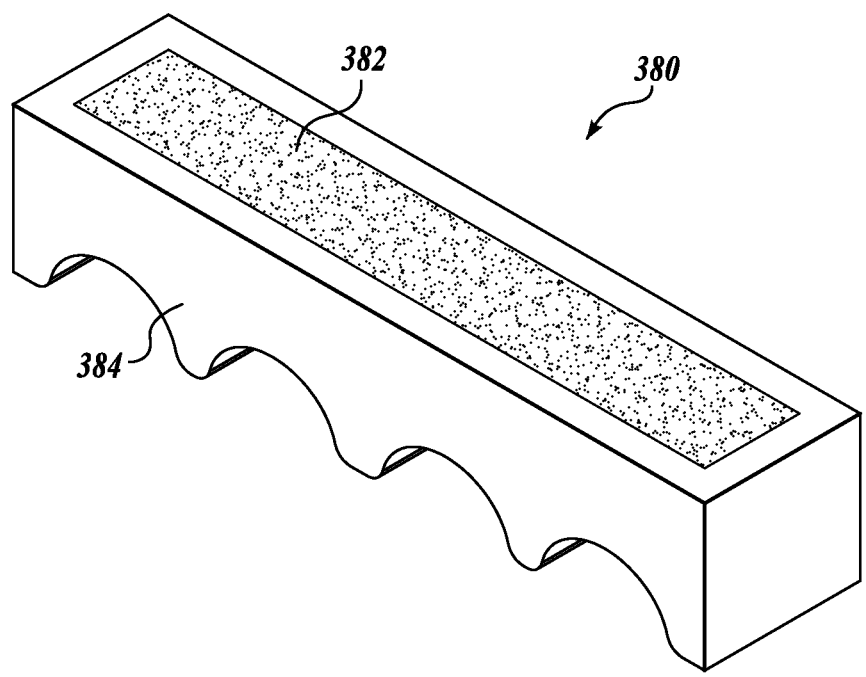
FIG. 10 is a sketch showing a removable handle for a planter.

Another handle 370 for use with a planter is shown in FIG. 9. The handle 370 is suitable for use with a round-shaped planter (not shown). Generally speaking, the handles can be made of either a flexible material, such as foam, or a firm material, such as polymeric resin. The handles can also be made from a combination of these materials. The handle 370 depicted in FIG. 9 has a soft foam interior 372 and a hard or more rigid resin exterior 374. Alternatively, the soft foam interior 372 may be omitted to leave an open channel for receiving the barrier. Although recesses are shown in two opposed locations on the handle 370, it will be appreciated that alternatively the handle may be configured with recesses along the entire lower edge of the handle 370. FIG. 10 is a sketch showing a handle 380 for use with a rectangular-shaped planter (not shown) that has a soft foam interior 382 and a hard resin exterior 384. As noted above, the barrier 312 may be formed as a separable member that is attached to the planter. For example, the barrier may be elastically stretchable (for example by adding one or more elastic members, such as surgical tubing) such that the barrier can be stretched over a planter and retained elastically.

Figure 11:
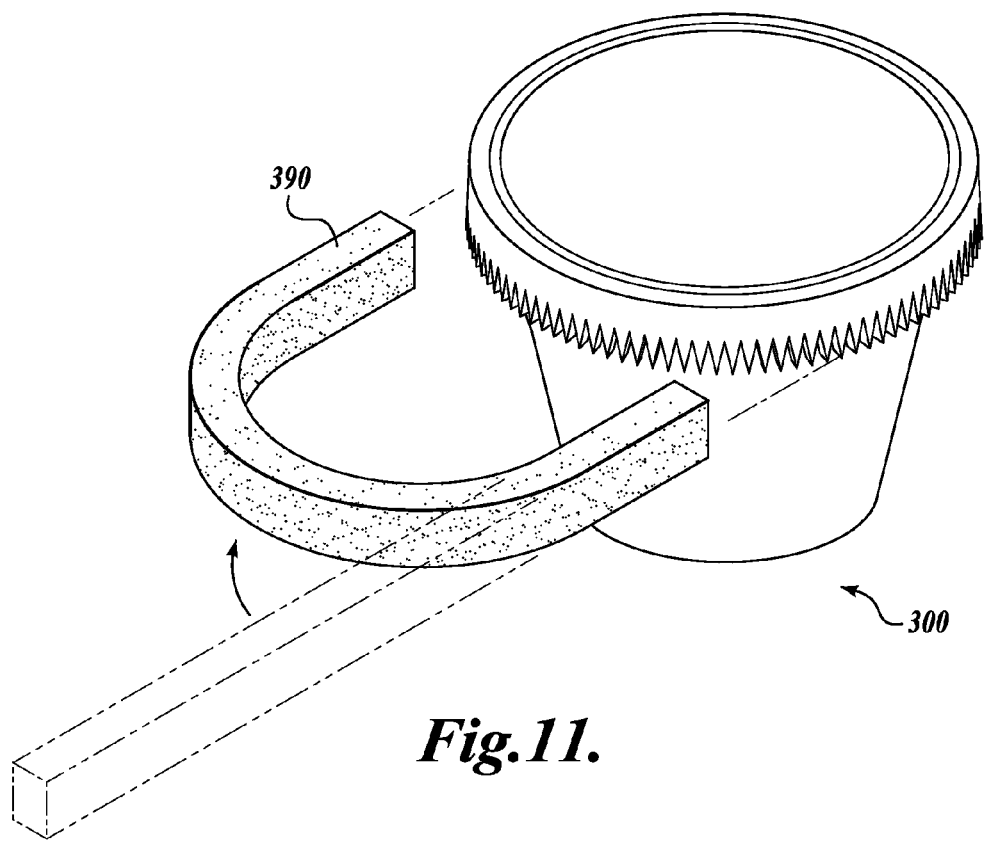
FIG. 11 is a sketch showing a planter with a foam carrying device.

An alternative carrying device 390 that is suitable for use with the planter 300 is shown in FIG. 11. The carrying device 390 is a flexible foam section that can be wrapped around a planter 300 and used to transport the planter 300.

Figure 12:
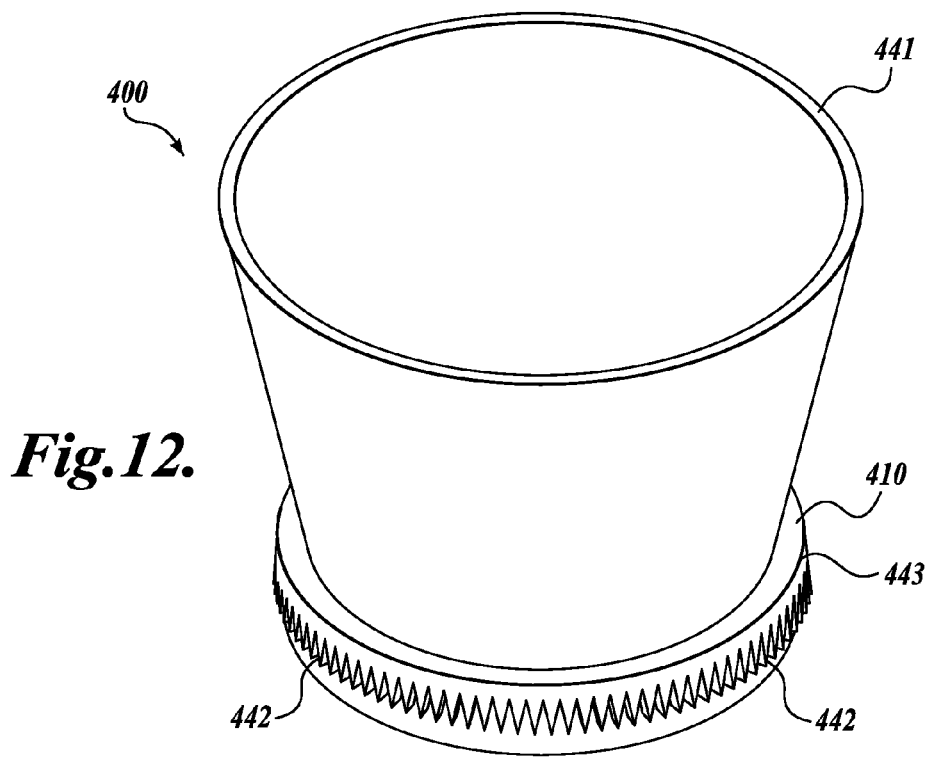
FIG. 12 is a sketch showing a planter having a base with an integrated mollusk barrier.

A planter 400 comprising a plant pot 441 having a separable tray or base 410 with belt 443 is shown in FIG. 12. Of course, the tray 410 may have a larger diameter than the plant pot 410. The belt 443 has a plurality of projections defining a mollusk barrier 442 that are spaced vertically and horizontally around the belt 443.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A barrier for deterring gastropod mollusks from entering an area, the barrier comprising:
   (a) an elongate tubular support comprising a plastically deformable core member and an outer sheath disposed radially outwardly from the core member and extending from a proximal end of the outer sheath to a distal end of the outer sheath, wherein the outer sheath has at least one opening at an intermediate location between the proximal end and the distal end that exposes the core member;
   (b) a first barrier end and a second barrier end, the first and second barrier ends being releasably connectable;
   (c) a plurality of outwardly extending projections attached to the tubular support, the projections spaced circumferentially and longitudinally along the tubular support to define the barrier, wherein the projections are attached to the tubular support in a location different from the at least one opening; and
   (d) at least one outwardly extending spike attached to the tubular support, wherein the at least one spike is configured for insertion into a substrate to position the barrier in a desired location.

2. The barrier of claim 1, wherein the plastically deformable core member is a metal wire.

3. The barrier of claim 1, wherein the plastically deformable core member is a copper wire.

4. The barrier of claim 1, wherein the outer sheath is polypropylene.

5. A method for deterring gastropod mollusks from entering an area, the method comprising:
   (a) positioning a barrier along the perimeter of the area, wherein the barrier comprises:
      (i) an elongate tubular support comprising a plastically deformable core member and an outer sheath disposed radially outwardly from the core member and extending from a proximal end of the outer sheath to a distal end of the outer sheath, wherein the outer sheath has at least one opening at an intermediate location between the proximal end and the distal end that exposes the core member;
      (ii) a first barrier end and a second barrier end, the first and second barrier ends being releasably connectable;

(iii) a plurality of outwardly extending projections attached to the tubular support, the projections spaced circumferentially and longitudinally along the tubular support to define the barrier, wherein the projections are attached to the tubular support in a location different from the at least one opening; and (iv) at least one outwardly extending spike attached to the tubular support, wherein the at least one spike is configured for insertion into a substrate to position the barrier in a desired location.

6. The method of claim 5, wherein the plastically deformable core member is a metal wire.

7. The method of claim 5, wherein the plastically deformable core member is a copper wire.

8. The method of claim 5, wherein the outer sheath is polypropylene.

* * * * *

UNITED STATES PATENT AND TRADEMARK OFFICE
CERTIFICATE OF CORRECTION

PATENT NO. : 9,107,350 B2
APPLICATION NO. : 12/981357
DATED : August 18, 2015
INVENTOR(S) : Shields et al.

Page 1 of 1

It is certified that error appears in the above-identified patent and that said Letters Patent is hereby corrected as shown below:

In the Specification

| COLUMN | LINE | ERROR |
|---|---|---|
| 2 | 20 | "through hole" should read --through-hole-- |
| 4 | 64 | "can lengthened" should read --can be lengthened-- |
| 5 | 12 | "located the" should read --located near the-- |
| 5 | 23 | "an a planter" should read --an elongate flexible barrier similar to barrier 2000 (FIGURE 5), that is configured to attach to a planter-- |
| 5 | 27 | "end to end with a other" should read --end-to-end with other-- |
| 5 | 31 | "barrier may" should read --barriers may-- |
| 5 | 49 | "is shaped" should read --are shaped-- |
| 5 | 55 | "receive facilitate slideably" should read --facilitate slideably-- |
| 6 | 18 | "pot 410" should read --pot 441-- |

Signed and Sealed this
Twelfth Day of April, 2016

Michelle K. Lee
*Director of the United States Patent and Trademark Office*